Fig. 1

INVENTOR
WALTER C. TRAUTMAN

BY Strauch, Nolan & Neale
ATTORNEYS

United States Patent Office 3,106,936
Patented Oct. 15, 1963

3,106,936
PILOT OPERATED FLOW MODULATING VALVE
AND MOUNTING MEANS
Walter C. Trautman, Riverside, Ill., assignor, by mesne assignments, to Link-Belt Company, a corporation of Illinois
Filed Nov. 21, 1958, Ser. No. 775,621
13 Claims. (Cl. 137—269)

This invention relates to a flow modulating valve and more particularly to flow line regulation by a hydraulically operated, automatic, flow modulating valve. It is contemplated that an electric remote control be provided to set and adjust the automatic modulating valve to desired flow conditions.

The valve hereinafter fully disclosed was conceived primarily to fill a need in the petroleum pipeline industry for a reliable, controllable flow modulating valve for use in remote unattended locations, such as pumping stations, bulk delivery plants and branch line stations. Prior to the rapid expansion in use and installation of pipeline delivery systems, it was conventional practice to utilize compressed-air operated regulating valves at control stations and such valves had excellent operating characteristics and, as long as the compressed air source was available, had a great degree of reliability. Even so their reliability depended upon a rigid maintenance and service schedule to maintain compressed air plants or a complete auxiliary compressed air system, e.g., at a bulk delivery plant.

As pipelines have become more common and have been extended for thousands of miles with a requisite attendant number of pumping, branch and delivery stations, there has been a rush in development of electronically instrumented and controlled electro-hydraulic operators to operate the line flow regulating valves. Such electronic control electro-hydraulic systems are costly, cumbersome and vulnerable to troubles. They seem inherently incapable of necessary ranges of dynamic response during flow regulations which was and is characteristic of compressed air valve operators and which is a necessity for stable regulatory control action (non-oscillating). Nevertheless, because leading pipeline companies have found, previous to this invention, that nothing else was available, the electronic control, electro-hydraulic operators were reluctantly received and utilized, it still being realized that within the pipeline industry there existed a need for an automatic valve which would (1) have the operating characteristics of a compressed air operated regulating valve and (2) avoid the complexity and lack of reliability of the electronic control system.

The present invention with improved reliable and stable flow control action is based on the use of a full hydraulic control system with the control pressure being derived directly from the line being controlled. Settings for the hydraulic control mechanisms are made by means of an electric system and it is contemplated that such settings can be controlled remotely by supervisory systems if so desired. The present inventive method of flow modulating control is applicable to the diverted flow from main lines to bulk delivery plants, in proportioning line flow from main to branch lines, and in a flow modulated control of centrifugal boost pumps, among other applications.

Accordingly a primary object of this invention resides in the provision of a novel reliable and stable hydraulically controlled automatic flow modulating valve.

Another object resides in a novel method of hydraulically controlling a flow modulating valve actuated by a bleed type piston motor which includes the steps of controlling a motor operating back pressure by regulating flow control of fluid from the motor and by governing the flow control regulation responsive to a line pressure condition.

Still another object resides in providing a novel hydraulically controlled automatic flow modulating valve having hydraulically balanced pilot control means for metering control fluid from a hydraulic, valve actuating motor, the metering regulation being responsive to line pressure, of the line in which the valve is connected, acting in opposition to a spring load. In conjunction with this object, a further object contemplates that the spring load be variable and controlled through a reversible electric motor and that control for the electric motor can be on-site or remote by means of a supervisory system.

A still further object resides in providing novel, multiple, condition responsive control line flow metering or control devices in such a modulated valve as set forth in the preceding object. In this respect, this object envisages multiple pressure responsive governing of hydraulically balanced flow metering devices in controlling pressure in a main valve hydraulic motor actuating chamber. It is still a further related object that such multiple flow control devices be arranged in series control and that at least one of the control devices can be a safety device to permit a positive main valve closing actuation responsive to an emergency condition requiring valve shut down.

Still another object resides in the provision of a novel flow modulating system in which a main valve is operated by a bleed piston type of hydraulic motor, the back pressure on the bleed piston face is controlled by flow control valves in an outlet line from the piston bleed chamber, at least one of the flow control valves is a hydraulically balanced metering valve responsive to system line pressure and loaded by a controlled variable spring device and the control valves and controlled spring device are located in a removable main valve head assembly adaptable for use with any of a plurality of sizes of main valves.

A still further object resides in the provision of novel automatic hydraulic flow modulating systems in which a main hydraulically actuated valve controls flow in pipelines or output of a centrifugal boost pump in a reliable and stable manner, such control being obtained by novel, hydraulically balanced, flow metering, pilot valve units.

Still a further object resides in the provision of novel pilot, flow metering, valve unit which is spring loaded and positioned in accord with a hydraulic pressure condition and in which the metering passages and components are completely hydraulically balanced so metering is not effected by pressure differences in the metered fluid. In connection with this object, it is still a further object to provide novel variable rate, leaf spring, pilot valve loading devices.

Further novel features and other objects of this invention will become apparent from the following detailed description, discussion and the appended claims taken in conjunction with the accompanying drawings, showing preferred structures and embodiments, in which:

FIGURE 7 is a section view of the removable unitary load sensitive flow metering pilot valve used in the control head of the flow modulating valve;

FIGURE 8 is a section view of a flow metering pilot valve similar to the one illustrated in FIGURE 7 but using a modified valve spool enabling its use as a second load sensitive flow control pilot valve for use in the control head of the flow modulating valve when used as a centrifugal pump control valve;

FIGURE 9 illustrates the mounting pad face of the control valves shown in FIGURES 7 and 8;

With reference now to the drawings, exemplary modulating valve structures which include a main valve assembly with control head will be first described in detail, followed by a description of several fluid flow systems incorporating flow modulating valves in accord with this invention.

Figure 1:
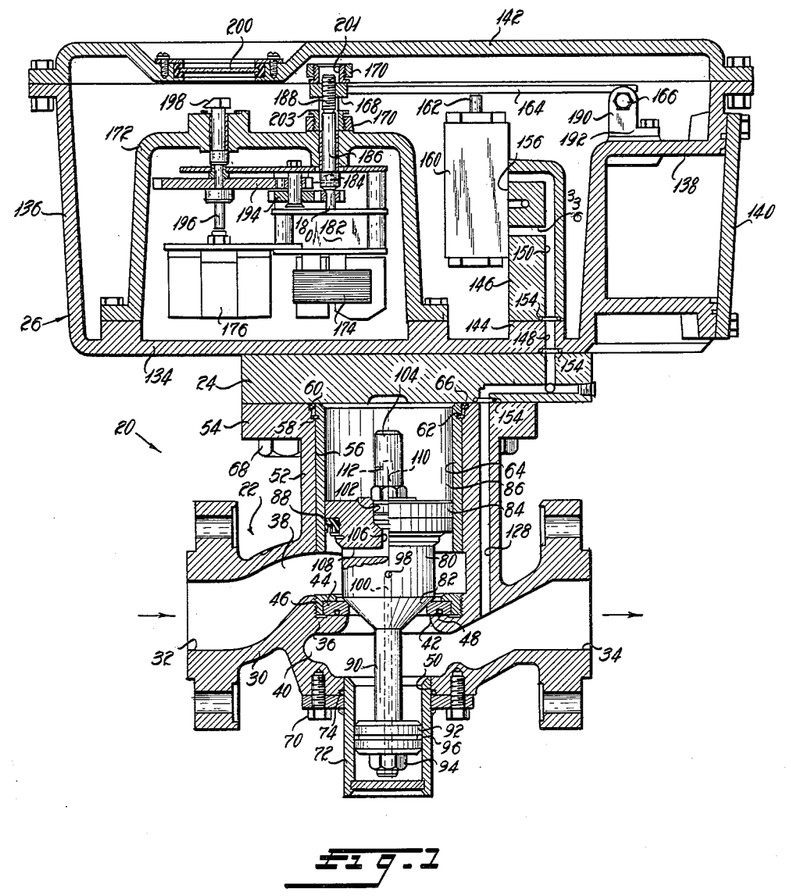
FIGURE 1 is a sectioned side view of a remotely controlled hydraulically operated flow-modulating valve with control head assembly in accord with the concepts of this invention.

Referring to FIGURE 1, a flow modulating valve 20 includes a main valve 22, an adapter 24 and a control head 26. It is contemplated that a universal control head unit will accommodate a range of sizes of main valves, e.g., main valves for 2 to 6 inch pipe sizes, by using an appropriate adapter 24. The same control head unit and main valve unit can be used for line flow control and for centrifugal boost pump control by using modified adapters and interchangeable control valve units, control valve mounting block and control valve operating levers in a manner which will become apparent as this description proceeds.

Main valve unit 22 is a floating poppet type valve consisting of a casing 30 with inlet 32 and outlet 34 and an intermediate partition 36 dividing the control chamber of the valve into an upper inlet chamber 38 and lower outlet chamber 40. Horizontal partition 36 is apertured at 42 and supports a ring seat 44 secured by a retaining ring 46 around the perimeter of the inlet chamber side. A sealing O-ring 48 can be disposed between the ring seat 44 and partition 36, if desired. An opening 50 is provided in the lower wall of casing 30 coaxially disposed relative to the partition flow aperture 42.

The upper portion of valve casing 30 is formed as an upstanding sleeve 52 having a flanged mounting end 54 and a cylindrical through opening 56 coaxial with the partition aperture 42.

The top end of the cylindrical opening 56 includes a double counter-bore to provide two seating shoulders 58 and 60, one of which serves to axially locate a snap ring 62 in the upper end of a cylinder sleeve insert 64 and the other shoulder 60 serving to seat an O-ring seal 66 which seals between the cylinder insert 64, the casing 30 and the adapter 24. When the main valve 22, adapter 24 and control head unit 26 are assembled and clamped together, as by the screws 68, the adapter 24 engages the upper end of cylinder insert 64 and retains it in assembled position.

Fixed in the lower casing opening 50 by screws 70 is a second cylinder 72. The exterior side of casing opening 50 is counterbored to provide an annular recess for an O-ring seal 74 which provides a fluid tight seal between the lower cylinder 72 and casing 30. Cylinder 72 is closed at its exterior end with the other end opening into the main valve outlet chamber 40, and lower cylinder 72, upper cylinder insert 64 and ring seat 44 are in coaxial disposition.

A valve head 80, with a frusto-conical seat 82, is positioned within casing 30 above the ring seat 44 and is adapted to control the flow through the valve in accord with the position of the head 80 relative to the seat 44. A piston 84 formed at the top of head 80 slidably fits within the upper cylinder insert 64, dividing the cylinder into a closed upper chamber 86 and a lower chamber which opens directly from the valve inlet chamber 38. A piston seal assembly 88 is disposed on the inlet chamber side of piston 84, preventing leakage of inlet line fluid past the piston 84 into the upper chamber 86.

A stem 90 extends from the lower end of valve head 80 into the lower cylinder 72 and carries a small piston 92 secured thereon by a nut 94. Piston 92 is slidably disposed in lower cylinder 72 with leakage past the piston being effectively prevented by an O-ring seal 96 held in a groove around the piston 92 and contacting the cylinder wall. The diameter of piston 92 is slightly less than the diameter of the opening through ring seat 44 for a purpose which will become apparent. The upper piston and cylinder unit and the lower piston and cylinder unit constitute a hydraulic motor operator for the poppet valve.

Inlet fluid communicates from the main casing inlet chamber through a radial passage 98 in the valve head and a connecting axial passage 100 through the valve stem 90 into the lower chamber in cylinder 72. Thus fluid under inlet pressure will always be present against the underside of the small piston 92 tending to bias the valve head 80 upwardly toward its open position. Inlet fluid pressure acts on the under side of the large piston 84 and a small portion of the head seat 82, also tending to bias the valve head 80 toward the open position.

Threaded into a tapped opening 102 in the upper end face of valve head 80 is a combined orifice and head limit stop fitting 104. The orifice fitting 104, by way of the tapped opening 102, communicates through drilled passages 106 and 108 in valve head 80 to the main valve inlet chamber 38. Thus under dynamic flow conditions inlet fluid under pressure can pass in a controlled manner from inlet chamber 38 into passages 108 and 106, into a blind bore 110 in fitting 104 and through orifice bleed 112 into the upper cylinder chamber 86 above piston 84.

Under a static condition, when no fluid is permitted to pass from upper cylinder chamber 86, the pressure on fluid in that chamber will be equal to the inlet line pressure, and since the areas of the head assembly 80, which are affected by fluid under pressure when the valve 20 is open, are balanced the weight of the head assembly 80 will cause it to seat against the ring seat 44. When so seated the cross section area of the upper piston chamber, subjected to inlet fluid pressure tending to close the valve is greater than the cross section area of the head 80 and the lower piston 92 which subjected to inlet fluid pressure tending to open the valve, thus the different pressure forces caused by differential areas will maintain the valve head 80 seated under pressure.

Controlling flow through outlet passages (to be described) from the upper cylinder chamber will enable a controlled opening of the main valve because of a resultant control of back pressure in the upper chamber which causes the main valve to close.

Figure 10:
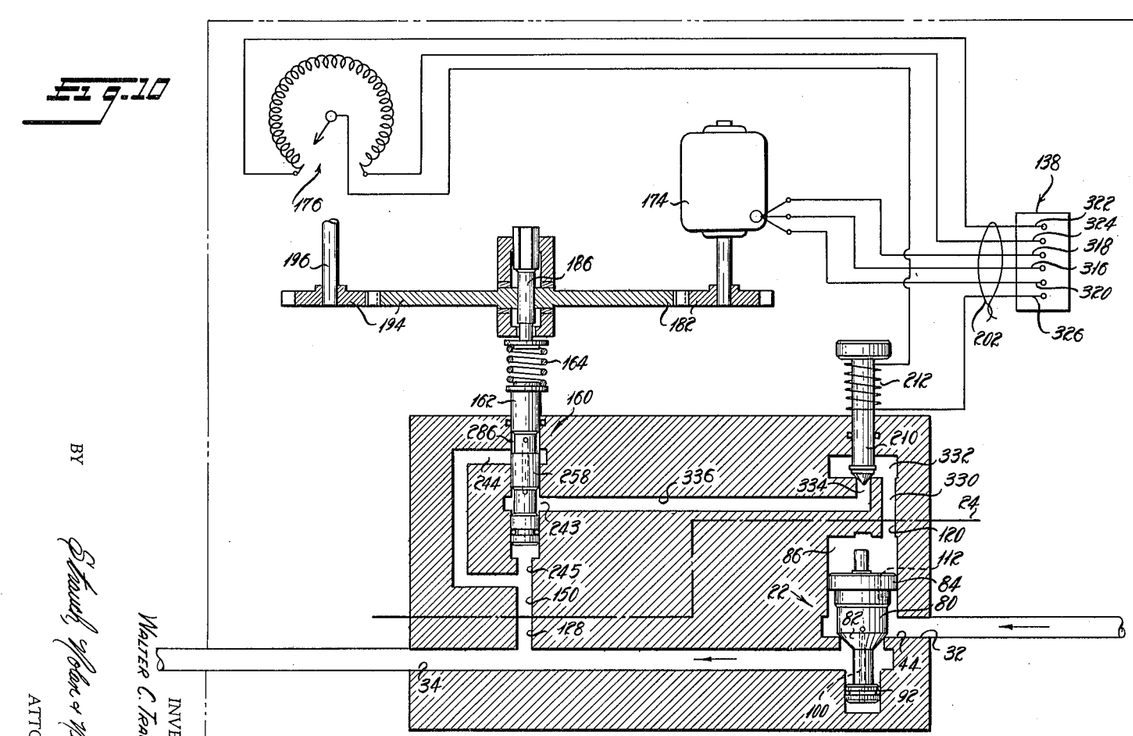
FIGURE 10 is a schematic diagram of the flow modulating valve, the control head of which is illustrated in FIGURE 5, adapted for delivery control to bulk plants or to proportion flow in branch lines.
Figure 11:
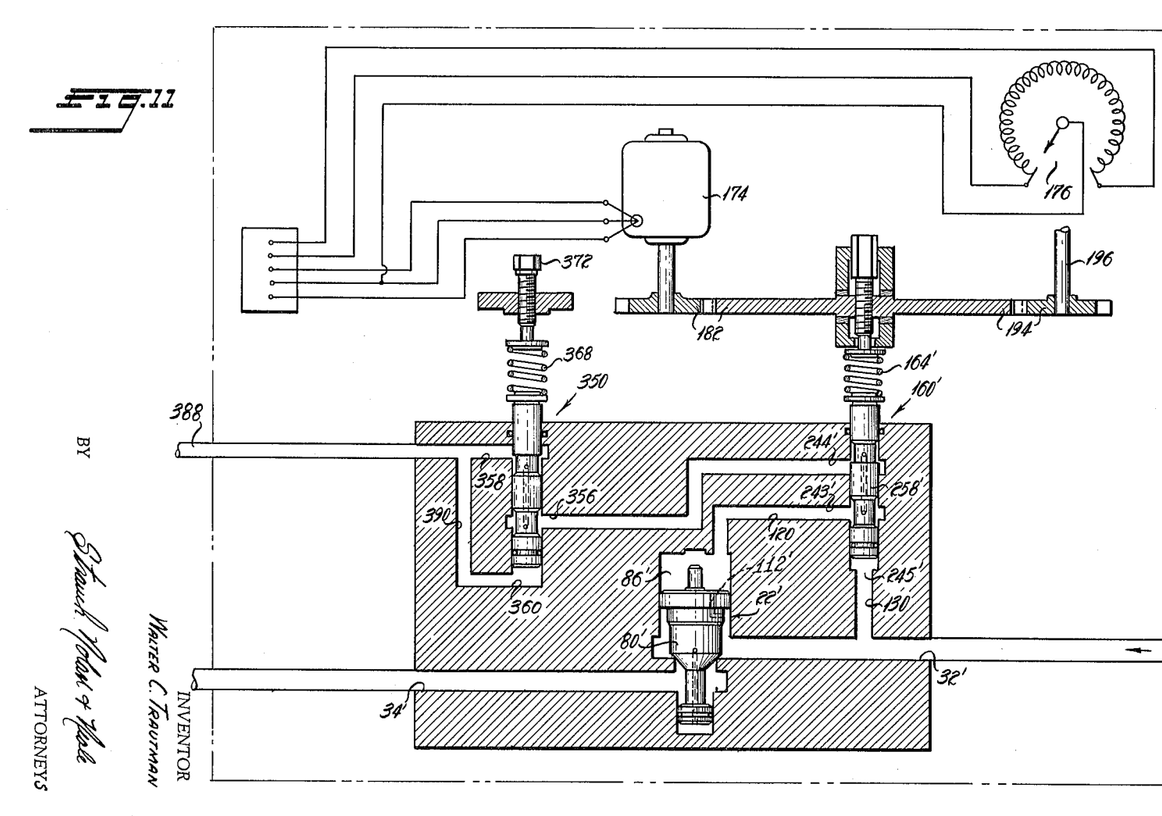
FIGURE 11 is a schematic diagram of the flow modulating valve, the control head of which is illustrated in FIGURE 6, adapted for suction and pressure control on centrifugal booster pumps.

The control of flow from the upper piston chamber 86 is enabled by means of a passage 120 (not shown in FIGURE 1, but seen in FIGURES 10 and 11) from the chamber 86 through the adapter 24, an appropriate passage in the lower wall of the control head 26 and through various passages in the control valve mounting block 146 to the pilot control valves. To enable the control valves to be loaded, in a manner to be explained, by pressures of the fluid in the main valve controlled lines, the main valve casing is provided with a passage 128 from the outlet side 34 to the mounting face of the sleeve flange 54, and a second passage 130 (not seen in FIGURE 1 but shown in FIGURE 11) from the inlet side 32 of the valve. One or the other of passages 128 or 130 is used, depending on the type of control installation, to furnish line fluid to control loading of a pilot valve. The adapter 24, which will be used for a desired installation, will have appropriate passages that enable fluid communication through the adapter from the upper piston chamber 86 and one or the other of passages 128 and 130, to appropriate connecting passages in the control head. Schematic diagrams of such control installations are shown in FIGURES 10 and 11, the FIGURE 10 schematic corresponding to the structure seen in FIGURE 1.

Control head 26, seen in FIGURES 1-6, is removable from the main valve unit 22 as a separable unitary assembly and includes a base 134 with upstanding side walls 136 forming a box-like support structure. One of the side walls is recessed from the exterior to provide an explosion proof electrical junction box 138 closed by a cover plate 140. A head cover 142 fits over and encloses the control head 26. On the inner side of base 134 is a boss 144 which serves as a mounting pad for a control valve mounting block 146. Vertical through passages, such as 148, in boss 144 are aligned with proper passages in adapter 24. Other passages such as passage 150 in control valve mounting block 146 communicate with proper passages in the boss 144 when valve mounting block 146 is secured in boss 144 by screws 152 (see FIGURES 5 and 6). Small O-rings or similar suitable seals 154 surround the joinder of control fluid passages between main valve 22, adapter 24, control head 26, block 144 and the control valves.

Block 146 carries two control valves in each of the disclosed embodiments of the modulating valve and for that purpose has valve mounting pads on its side face 156 to which the control valves are bolted. The control valve 160 seen in FIGURE 1 is a pilot control valve of the spool plunger type with one end 162 of the valve spool stem projecting out of the upper end of the control valve casing and adapted to engage the under side of a leaf type biasing spring 164, the biasing force of which can be remotely controlled.

As will be later described, the leaf spring 164 provides a bias force on the control valve spool against a fluid pressure loading applied against the spool in the opposite direction. In schematic FIGURES 10 and 11 the control valve biasing springs are illustrated as coil springs for convenience in representation. By suitable structural changes, coil springs could be used in lieu of leaf springs.

In FIGURE 1, leaf spring 164 has its right hand end resting on top of a fulcrum bolt 166 and its left hand end, provided with an integral threaded nut 168, extends under the bridge of a limit stop bridge bracket 170. The bridge bracket 170 is bolted to the upper side of an internal explosion proof cover 172 enclosing a reversible electric motor 174, a signal feed back transducer 176 and a solenoid 178 (not seen in FIGURE 1 but shown in FIGURE 10).

Electric motor 174 drives an output shaft 180 through a gear reduction 182. Output shaft 180 is keyed by pin 184 to a drive stub shaft 186 which has a threaded upper end 188 extending vertically through a bushing in the cover 172. Drive shaft 186 is axially fixed in the cover 172, and its threaded end 188 projects through large size threaded holes in the lower and upper portions of bridge bracket 170. The end 188 of shaft 186 is threaded through the aforementioned nut end 168 of leaf spring 164 so rotation of shaft 186 will raise or lower the left hand end of the leaf spring. This linkage tends to maintain spring 164 in a horizontal disposition as its nut end is raised or lowered. The right hand end of the spring 164 fits between two ears 190 of a bracket 192 which supports the spring fulcrum bolt 166 and prevents the spring from turning with rotation of the shaft 186.

When motor 174 is remotely operated to rotate shaft 186 and lower the spring end nut 168 the right hand end of the spring 164 abuts the fulcrum bolt 166 and of the spring leaf is flexed. Increased spring flexure result in an increased spring force opposing upward movement of the control valve spool whose stem end 162 engages the lower side of the leaf spring. In this manner the pilot control valve spring loading can be changed remotely. The control action will be described hereinafter.

In controlling the electric motor 174 a supervisory control system is used in which the control station (not shown) utilizes a remote indicating device electrically connected with the signal transducer 176 which is connected to the motor output shaft 180 by means of a step down gear train 194. By using a suitably calibrated scale on the supervisory indicator, the remote operator can determine the load setting of the control valve to provide a desired rate of flow of fluid through the main valve 22. To provide visual indication of the control valve loading setting at the control head, shaft 196 of the transducer is directly connected to an indicator 198 which with its appropriate scale located on top of the interior explosion proof cover 172 is visible through a window 200 in the control head cover 142.

Limit stop bushings 201 and 203 are threaded into the large upper and lower threaded holes in the bridge bracket 170 and serve to define upper and lower limit positions for remote positioning of load spring 164.

Figure 5:
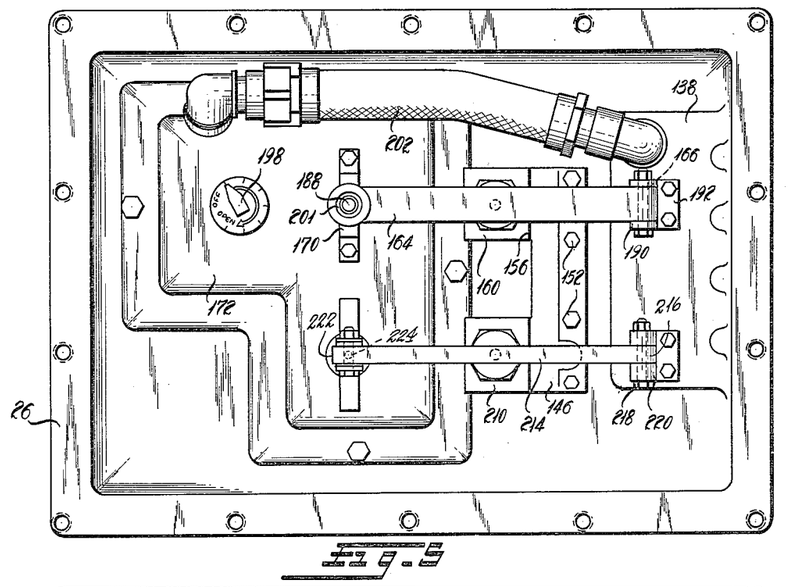
FIGURE 5 is a top plan view, with the control head cover removed, of one embodiment of the flow modulating valve adapted for use in controlling flow in lines such as branch lines and diversion lines to delivery stations.
Figure 6:
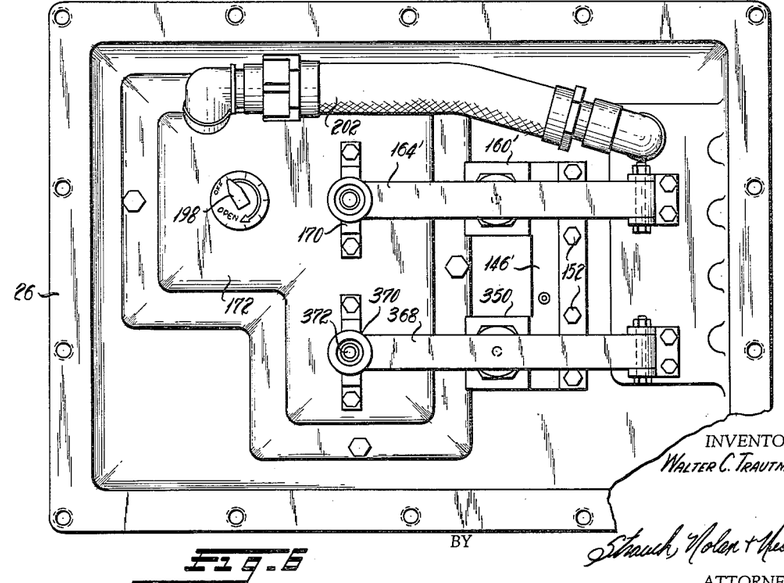
FIGURE 6 is a view similar to FIGURE 5 illustrating a modified control link used in the control head when the flow-modualting valve is utilized as a centrifugal pump control valve.

As seen in FIGURES 5 and 6, an electric conduit 202, preferably made with pressure tight, explosion-proof components, connects between the interiors of the motor cover 172 and the junction box 138.

As indicated in FIGURE 10, the second control valve 210, of this embodiment is an off-on solenoid operated safety valve, held in the open position by current in the control circuit. When the control system fails the solenoid 212 becomes inoperative to hold the valve open. Actually FIGURE 10 shows the solenoid 212 and valve 210 in schematic illustration. In FIGURE 5, valve 210 is an "off-on" plunger type valve unit secured in position for proper fluid communication with various passages, on the face 156 of control valve mounting block 146. Instead of a leaf spring engaging the valve stem, as for valve 160, a solid lever 214 is pivotally connected at its right hand end 216 to a fulcrum bolt 218 secured in a bracket 220.

The left hand end 222 of solid lever 214 is pivotally connected to an end 224 of a solenoid plunger which projects up through the explosion proof cover 172. Solenoid 212 is contained within the cover 172 and when energized will pull the solid lever 214 downward to engage and depress the plunger of off-on valve 210 and will hold the valve open. Valve 210 is biased to its closed position and will be in closed position whenever the solenoid is de-energized. Appropriate control passages for the solenoid safety valve 210 are contained in the block 146, control head base 134 and adapter 24.

Figures 2, 3, 4:
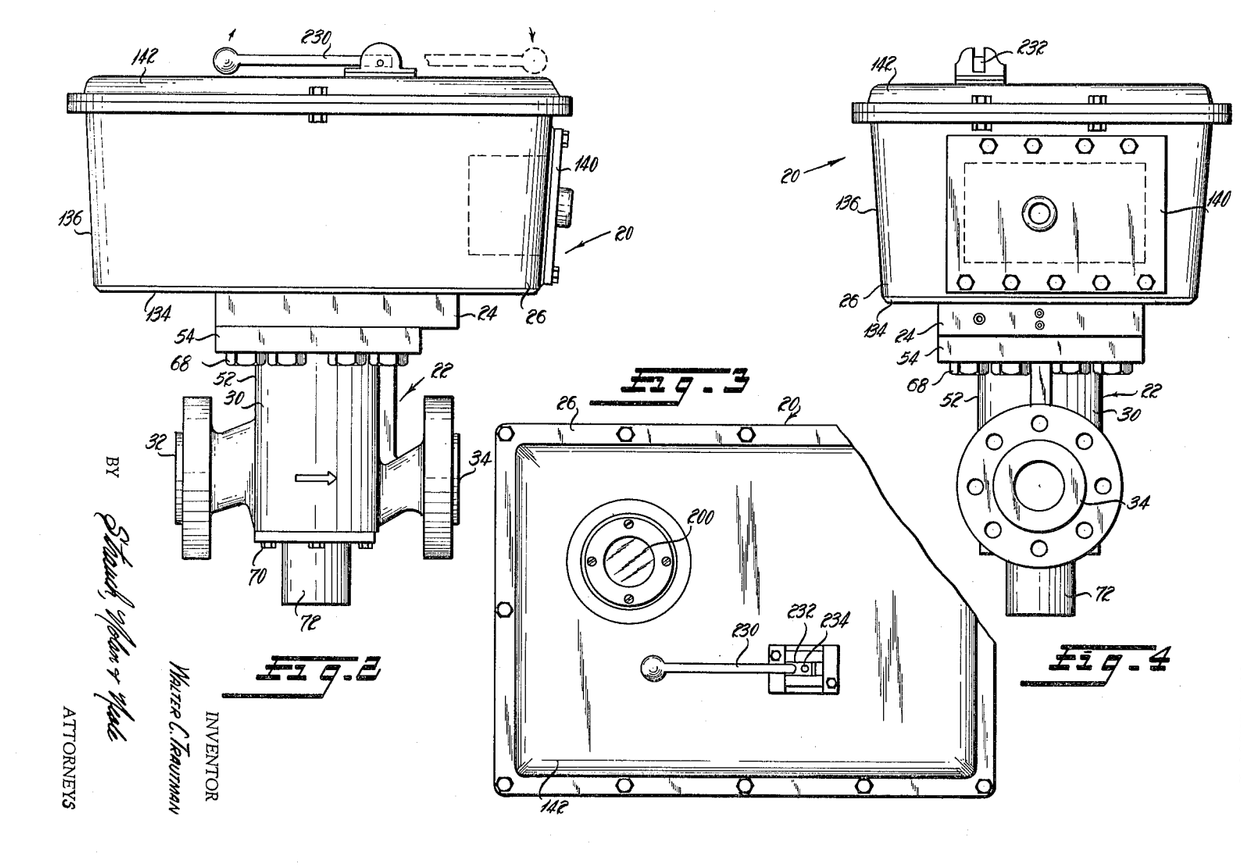
FIGURES 2, 3 and 4 are respectively, side elevation, top plan and end elevation views of a flow-modulating valve and control head assembly as shown in FIGURE 1.

A lever control is provided to open the on-off valve 210 manually if necessary or desired. FIGURES 2, 3 and 4 show a lever 230 pivoted on the control head cover 142. The pivoted end 232 of lever 230 has a lug 234 secured thereto and when the lever 230 is swung to the phantom line position (FIGURE 2) lug 234 will engage the upper side of solid lever 214 and press it downward to open valve 210, independently of solenoid action.

Turning now in FIGURE 7, the details of pilot control valve 160 are illustrated. This valve is a flow metering valve and has a casing 240 with a cylindrical through bore 242 and three side ports 243, 244 and 245. Recesses 246 on the mounting face of the valve casing 240 receive the aforementioned O-ring seals 154. A valve stem gland nut 248 is threadedly secured in the upper end of the casing 240 and axially maintains a locating ring 250 against a shoulder 252 at the upper end of bore 242. Pressure sealed stem packing, 254 and 256, is compressed between gland nut 248 and locator ring 250 to seal the projecting stem end 162 of valve spool 258.

Valve sleeve units 260 and 262, in telescoped arrangement, fit inside the casing bore 242 and around the spool 258 with a close smooth fit. Sleeve units 260 and 262 are maintained in proper position in bore 242, by abutment of unit 260 against the locator ring 250 and by a lower pressure seal assembly 264, a biasing coil spring 266 and a bottom casing plug 268. Elements 256 and 264 of the upper and lower seals are hard plastic guide and backup rings for the pressure seals.

Apertures 270 in the lower sleeve unit 262 permit fluid communication from an outer annular groove 272 in sleeve 262 to an inner annular chamber 274 surrounding spool 258. The outer chamber 272 communicates with middle port 243 (inlet port) in casing 240. Apertures 276 in upper sleeve unit 260 permit fluid communication from an outer annular groove 278 between sleeves 260 and 262 to an inner annular chamber 280. The outer groove 278 communicates with upper port 244 (outlet port) in casing 240. Port 245 in casing 240 communicates with a chamber 282 surrounding the lower end of spool 258 and can be designated as the condition responsive loading port.

Within the inlet chamber 274, spool 258 is grooved at 284 and this groove communicates with the inlet fluid in chamber 274 at all positions of the spool. Disposed in offset relation to the upper chamber 280 is a second groove 286 in spool 258. This groove 286 is disposed so that vertical shifting upward movement of the spool will gradually diminish and finally close an annular opening from chamber 280 to groove 286. Fluid communication between the lower spool groove 284 and upper groove 286 is provided by an axial bore 288, plugged closed at the lower end of the spool, and cross passages 290 and 292 leading from grooves 284 and 286 respectively into the bore 288. In this embodiment of control valve structure, when the valve spool 258 is raised a sufficient distance, fluid communication from inlet port 243 to outlet port 244 is shut off. By introducing a control fluid under pressure into port 245 against the lower end of the valve spool 258, the spool 258 will be biased upwardly, metering the flow from inlet port 243 to outlet port 244 as it moves in direction tending to close off passage of fluid through the control valve. As previously described, this hydraulic loading is opposed by the upper end 162 of the valve spool being biased downward by the controllable spring force of leaf spring 164.

*Operation*

Figure 13:
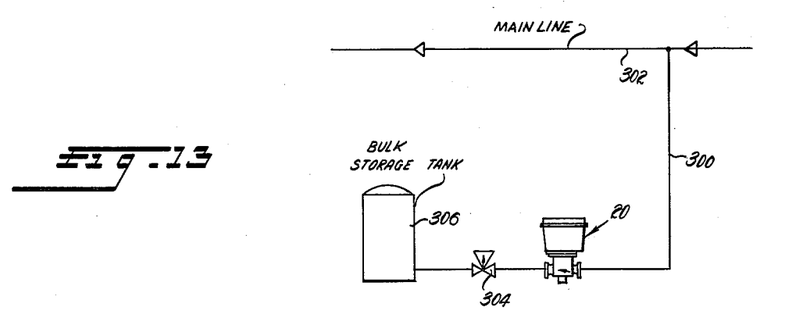
FIGURE 13 is a schematic flow system illustrating the incorporation of the flow modulating valve as a control valve in a bulk plant delivery installation.
Figure 14:
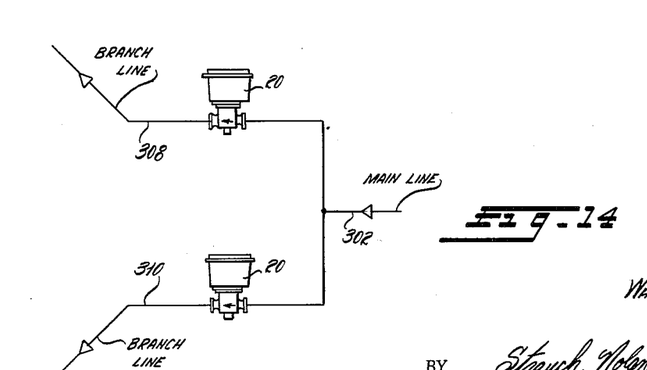
FIGURE 14 is a schematic flow system illustrating the incorporation of the flow modulating valve in branch line control installations.

Referring to FIGURES 10, 13 and 14, the flow modulating valve 20 described hereinbefore, embodies control head features enabling its use in controlling flow in pipeline installations such as branch lines and bulk plant delivery stations.

FIGURE 13 represents an unattended bulk delivery plant in which a line 300 taps fluid from a main line 302, delivers it under main line pressure to a flow modulating valve 20, thence through a flow meter 304 to a bulk storage tank 306.

FIGURE 14 represents two branch lines 309 and 310 tapped off a main line 302, the flow rate in each branch line being controlled by a flow modulating valve 20.

The hydraulic control components and the electrical supervisory components of flow modulating valve 20 can be the same for both of these types of flow control installations and operation will be described with reference to FIGURE 10.

The electrical supervisory system can be operated by a 100 watt source of 110 volt 60 cycle single phase alternating current at the site of the flow modulating valve. Other suitable electrical sources could be used as desired. Electrical control can be at the site of the valve or remote by a supervisory control system, e.g., land line or micro-wave. Electric lines from whatever type of control is to be used enter the junction box 138, line 316 being common to the motor 174, the transducer 176 and the solenoid 212. Lines 318 and 320 provide reversible control circuits to motor 174, lines 322 and 324 provide transducer signal circuit connections and line 326 enables a control connection to solenoid 212. Electric current failure to components or deliberate control of the solenoid circuit to an "off" position will de-energize the safety solenoid 212 and valve 210 will close to shut off flow from the motor chamber 86.

So long as safety valve 210 is closed no fluid can pass from upper chamber 86 above the large piston 84 of the main valve head 80. In this condition upstream line fluid entering valve 22 at inlet 32, passing through the orifice bleed 112 to the upper piston chamber 86, builds up to provide upstream line pressure against large piston 84 and thereby maintains the valve head 80 in closed position on seat 44.

Outlet passage 120 from upper piston chamber 86 communicates, through the adapter 24 (indicated by the heavy broken line in FIGURE 10) through a passage 330 to the inlet port 332 of solenoid safety valve 210. If the safety valve 210 is opened, either by solenoid control or manually at the site, a fluid passage through the safety valve 210 from its inlet 332 to its outlet 334 will be provided. Safety valve outlet 334 communicates with a passage 336 in the control valve mounting block 146 to the inlet port 243 of flow metering control valve 160.

When main vlave 22 is closed there is no fluid flow in the downstream line and fluid control passage 128 from the outlet side of main valve 22 is under no pressure or (negligible downstream pressure). Metering control valve spool 258 will not be hydraulically loaded and therefore will be disposed at its extreme downward position by spring force, which position provides an open fluid passage from the control valve inlet 243 to the outlet 244. As previously described, passage 128 from the outlet side of main valve 22 communicates through the adapter to passage 150 in the control valve mounting block, which in turn communicates through branch passages to the loading port 245 and outlet port 244 of the flow metering pilot control valve 160. Thus when safety valve 210 is initially opened a fluid passage from upper piston chamber 86, through passages 120, 330, 336, valve 160 and passages 150 and 128, to the low pressure downstream line is provided to permit metered flow of fluid which reduces the back pressure on the upper side of the large main valve piston 84. Because of the orifice bleed 112, fluid pressure above the large piston cannot then be maintained equal to upstream fluid pressure which being present below the large piston 84 and below small piston 92 will unseat the valve head 80 permitting flow through fluid pressure balanced valve 22 into the downstream line.

Pilot control valve 160 is a flow control valve responsive to downstream line pressure as a function of flow through the line. The lower end of valve spool 258 is subjected to pressure of the downstream line fluid communicated through passages 128, 150 and port 245. Other than this hydraulic pressure loading, valve spool 258 is completely hydraulically balanced. Spool 258 is loaded on the lower end by downstream fluid pressure being sensed and on its upper external end 162 by the load spring 164. Thus for any given pressure being sensed by control valve 160 there is a corresponding controlled rate of flow through control valve 160 (and therefore a back pressure exerted on the upper piston chamber 86 of main valve 22). Since control valve 160 is otherwise in hydraulic balance, variations in pressure across the metering ports of the valve do not effect metering ability of the valve.

The flow rate downstream of the main valve 22 is equivalent to pressure being sensed by the lower end of control valve 160 and the desired control valve response condition can be varied by varying the loading of spring 164 through operation of motor 174. When the desired downstream flow rate is reached, control valve 160 will start controlled metering of the fluid outlet from the upper piston chamber 86 and will maintain the main valve head 80 in a floating balanced condition to provide desired rate of flow in the downstream line.

If the solenoid safety valve 210 is being utilized, failure in the electrical system will result in immediate closing of the valve 210 causing rapid closure of main valve 22. Should the manual over-ride of safety valve 210 be rendered operative, electrical failure merely results in continued flow at the rate for which pilot control valve 160 was set just before electrical failure.

The flow rate through main valve 22 can be changed or the valve completely closed by way of a remote supervisory control system or alternately by way of an on-site control system. If desired multiple control stations, which are well known, could be utilized to provide both a remote and an on-site control of the electric motor.

In the branch line system illustrated in FIGURE 14, each valve 20 of course will independently control the flow rate in its branch line, as determined by the setting of the load spring 164 for its pilot control valve 160.

The load spring settings can be determined by a visual on-site indicator or by means of a remote feed back system utilizing the transducer 176 and a supervisory station indicator.

Boost Pump Control Modification

The flow modulating valve of this invenition when used to control a centrifugal boost pump in a pipeline is modified slightly, from the assembly of modulating valve 20, previously described. However, the same main valve 22 and control head 26 can be used. A different control valve mounting block 146' within the head 26 is used to provide properly disposed fluid passages to two pilot control valves 160' and 350. A different adapter 24 is used, in which the downstream main valve control passage 128 is blocked and the upstream main valve control passage 130 is utilized. The control valve 160' is identical to control valve 160, wherein increased hydraulic pressure loading tends to close the valve, but its fluid pressure loaded end is in communication, through port 245' and passage 130, only with the inlet side of main valve 22, and is not in communication with the control valve outlet port 244' as in the previously described embodiment. Pilot control valve 350, also a flow metering valve is somewhat different from control valve 160' and that difference will now be described.

Referring to FIGURE 8, it will be apparent that all components of the control valve 350 are identical to those of control valve 160, excepting for the spool plunger 352. Control valve 350 is intended to meter fluid flow from the upper main valve piston chamber 86' when pressure on the suction side of a boost pump 354 falls below a desired value and its spool 352 therefore is constructed to gradually shut off fluid flow from the valve inlet 356 to the outlet as pressure loading on the lower end of spool 352, through port 360, decreases. To this end the outlet control groove 362 in spool 352 is offset downwardly from sleeve insert chamber 364, so downward movement of spool 352 will gradually close the metering space between groove 362 and outlet chamber 364. This control valve 350, excepting for its lower end hydraulic loading, is balanced hydraulically so variations in pressures in the metered fluid will have no effect upon the metering movements of the valve spool.

Referring now to FIGURE 6, it will be seen that the motor control and loading spring 164' for pilot control valve 160' are identical to that of the FIGURE 5 embodiment and need not be further described. The second pilot control valve 350 is spring loaded by a leaf spring 368 installed above the spool end 366 in a manner similar to that described for leaf spring 164 excepting that the adjusting nut end 370 is not conditioned by a motor. Instead it can be manually set to a desired spring loading equivalent to desired pump suction pressure by a screw fitting 372.

Operation of Boost Pump Control

Figure 12:
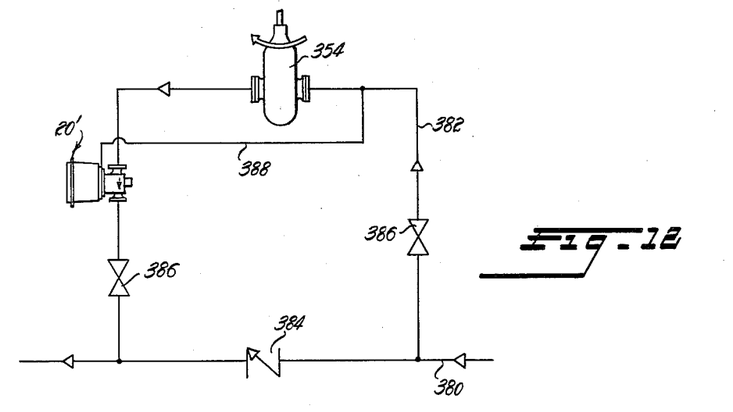
FIGURE 12 is a schematic flow system illustrating the incorporation of the flow modulating valve in a centrifugal boost pump installation.

The FIGURE 11 schematic representation of the flow modulating valve 20' shows the hydraulic control system used to control a centrifugal boost pump 354 connected in a main pipeline 380 as illustrated by the fluid control system shown in FIGURE 12. The boost pump 354 is placed in a bypass line 382 connected around a check valve 384 in a main line. Shut-off valves 386 of suitable known types can be used to shut off and isolate the boost pump bypass installation from the main line.

Flow modulating valve 20 is placed in the bypass line 382 on the discharge side of centrifugal boost pump 354 and is connected through a pilot line 388 to the bypass line 382 on the suction side of pump 354. The inlet 32' of main valve 22' is thus subjected to pump discharge pressure and, through passage 130 and appropriate adapter and control valve mounting block passages, the pump discharge pressure is directed against the bottom of spool 258' to hydraulically load the pilot control valve 160' against the load setting of spring 164'. Control valve 160' has its inlet 243' connected, through appropriate passages in the mounting block and adapter, to the upper piston chamber 86' of the main valve 22' and its outlet 244' is connected through appropriate passages in the mounting block to the inlet 356 of the suction pressure responsive pilot control valve 350. The outlet 358 of pilot control valve 350 communicates through a branch line 390 in the mounting block 146' to the lower valve loading port 360 of the same pilot control valve 350 and by means of a tapped outlet in the adapter is also connected through the pilot line 388 to the suction side of pump 354.

Flow modulating valve 22' is simultaneously responsive to discharge and suction pressure of the centrifugal pump to control the rate of output flow of the pump, the pilot control valves 160' and 350 metering flow of liquid (which is metered into chamber 86' through the piston bleed orifice 112') from the upper piston chamber 86' to control the position of main valve head 80' to provide a rate of flow in accord with the related pump discharge pressure and suction pressure. Main valve 22' will throttle the flow rate whenever the pump discharge pressure exceeds a desired value which can be set through the load spring 164' by supervisory remote control or by electrical on-site control, and whenever the pump suction pressure falls below a set value which is manually set through the load spring 368.

The foregoing description teaches a new concept in flow modulating valves and discloses two modifications one of which is used in flow control of a centrifugal boost pump in response to pump discharge and suction pressure and the other being for use in proportioning flow to a bulk plant take-off of a branch line. The main valve unit in both embodiments is a hydraulically positioned floating poppet valve with operating piston subjected to inlet pressure, one of the faces of such piston being subject to inlet fluid pressure through an orifice bleed into a control chamber. Fluid is metered from that bleed chamber in both embodiments by a pilot control flow metering valve disposed in a line from the chamber above the position operating piston to a lower pressure, line portion (suction side of the pump or the valve outlet to a branch line). Additional control valves can be placed in series in the line from the chamber above the position control piston, one type being a solenoid operated safety valve and another type being a metering control valve responsive to decreases in pump suction pressure to cause the main valve to move toward closed position and reduce rate of flow. The main valve can be the same for both embodiments and a standard control head with interchangeable pilot valve and pilot valve mounting components can be used for a series of main valves of different pipeline sizes. The pilot control valves are hydraulically balanced as to the metered fluid and are hydraulically loaded by pressure of the line fluid which is equivalent to the desired flow rate in the line. The control setting of the pilot valves can be varied by changing spring loading opposing the hydraulic loading. Variation in control setting of a primary pilot control valve is enabled by use of a reversible electric motor which can be operated by a remote supervisory control or by an on-site control. When using a remote supervisory control the spring load setting is transmitted by a transducer to a remote indicator at the supervisory station.

The invention may be embodied in other specific forms without departing from the spirit of essential characteristics thereof. The present embodiments are therefore to be considered in all respects as illustrative and not restrictive, the scope of the invention being indicated by the appended claims rather than by the foregoing description, and all changes which come within the the meaning and range of equivalency of the claims are therefore intended to be embraced therein.

What is desired and claimed to be secured by United States Letters Patent is:

1. A liquid flow control system comprising: a pipeline conduit with a flow modulating valve means in flow control relationship in said conduit; means for introducing liquid under pressure into said conduit upstream of said flow modulating valve means; said flow modulating valve means comprising: a main bleed piston controlled valve; control head means; control means partially in said control head means and including at least one fluid pressure balanced metering valve in fluid communication with said bleed piston to control back pressure on said bleed piston as a function of flow through said metering valve; means for sensing pressure of fluid in said pipeline conduit controlled by said main valve and loading said flow metering valve in one control direction in accord with the sensed pressure; selectively variable resilient means acting on said flow metering valve against the sensed pressure loading; and means removably mounting said control head means on said main valve; said control head means including control valve mounting means carrying said control valve means; and the combination of said mounting means for said control head means and said control valve mounting means providing first and second fluid communication paths between said main valve and said control valve means, said first fluid communication path placing said control valve means in fluid communication with said bleed piston and said second fluid communication path placing said control valve means in independent fluid communication with said pipeline conduit to enable sensing of at least one desired characteristic of a plurality of flow characteristics in said conduit pipeline by said pressure sensing means.

2. A fluid control system as defined in claim 1, wherein said conduit is a branch line and the means for introducing fluid under pressure into said branch line is a connection to a main line; and said second fluid communication path communicates with said conduit from the downstream conduit side of said main valve to said metering valve for hydraulically loading said metering valve in response to pressure of the fluid in said conduit downstream of said main valve.

3. A fluid flow control system as defined in claim 1, wherein said selectively variable resilient means includes a reversible electric motor and electrical control circuitry for said electric motor.

4. A fluid flow control system as defined in claim 3, wherein said control means includes a safety valve in said first fluid communication path in series with said metering valve; and control means for said safety valve, to selectively maintain said safety valve in an open position or permit it to move to a closed position, including a solenoid connected to said safety valve to open said valve upon energization of said solenoid and electric circuitry, including a portion of said electric control circuitry for said electric motor, for selectively energizing said solenoid.

5. A fluid flow control system as defined in claim 1, wherein said conduit is a bypass in a main pipeline and said means for introduicng fluid under pressure into said bypass includes a centrifugal boost pump in said bypass; said main valve is located in said bypass on the pump discharge side; and said second fluid communication path communicates with said conduit from the upstream pump discharge side of said main valve to said metering valve for hydraulically loading said metering valve in response to pressure of the pump discharge.

6. A fluid flow control system as defined in claim 5, wherein said control means also includes: a second metering valve in said first fluid communication path, in series with said first named metering valve, hydraulically loaded toward an open position by fluid under pressure from the pump suction side of said bypass and having a second resilient means loading the second metering valve toward a valve closed position; and means to vary the spring loading of said second resilient means.

7. A flow modulating valve comprising: a main bleed piston controlled valve; control head means; control means partially in said control head means and including at least one fluid pressure balanced metering valve in fluid communication with said bleed piston to control back pressure on said bleed piston as a function of flow through said metering valve; means for sensing pressure of fluid in a pipeline controlled by said main valve and loading said flow metering valve in one control direction in accord with the sensed pressure; selectively variable resilient means acting on said flow metering valve against the sensed pressure loading; and means removably mounting said control head means on said main valve; said control head means including control valve mounting means carrying said control valve means; and the combination of said mounting means for said control head means and said control valve mounting means providing fluid communication paths between said main valve and said control valve means so that said control valve means may be placed in fluid communication with said bleed piston and in independent fluid communication with the pipeline to enable sensing of at least one desired characteristic of a plurality of flow characteristics in said pipeline by said pressure sensing means.

8. The flow modulating valve as defined in claim 7 wherein said resilient means is contained within said control head means, said control head means further containing controllable power means which are connected in control relation to said resilient means.

9. The flow modulating valve as set forth in claim 8 wherein said controllable power means includes a reversible electric motor and electrical control circuitry for said electric motor.

10. The combination as set forth in claim 7, wherein said control means further includes a safety valve having a fluid flow series connection with said metering valve, and a control device for said safety valve to selectively maintain said safety valve in an open position or permit it to move to a closed position.

11. The combination as set forth in claim 7 wherein said fluid communication path in communication with the pipeline, provided by the combination of said mounting means for said control head means and said control valve mounting means, is connected to the downstream pipeline side of said main valve and enables sensing of fluid pressure downstream of said main valve.

12. The combination as set forth in claim 7 wherein said fluid communication path in communication with the pipeline, provided by the combination of said mounting means for said control head means and said control valve mounting means, is connected to the upstream pipeline side of said main valve and enables sensing of fluid pressure upstream of said main valve.

13. A flow modulating valve as defined in claim 7 wherein said main valve includes an inlet, an outlet, a valve seat, and a valve head; said inlet and outlet being adapted to be connected to control flow in said conduit; said valve head having expansible chamber motor means hydraulically balancing said head in selected positions relative to said valve seat control fluid flow through said valve from said inlet to said outlet, including an expansible control chamber with a metered inlet communicating with said valve inlet and an outlet line; said control chamber having sufficient area to unbalance the hydraulic forces on the main valve head and move it to a main valve closed position if said outlet line is sufficiently restricted to fluid flow; and said fluid communication path in communication with the main valve and said control valve means includes said outlet line from said expansible control chamber.

References Cited in the file of this patent

UNITED STATES PATENTS

| | | |
|---|---|---|
| 246,088 | Curtis | Aug. 23, 1881 |
| 474,244 | Hanson | May 3, 1892 |
| 479,234 | Webb | July 19, 1892 |
| 937,774 | Cunning | Oct. 26, 1909 |
| 1,754,250 | Wright | Apr. 15, 1930 |
| 2,049,233 | Thomas | July 28, 1936 |
| 2,091,596 | Kluppel | Aug. 31, 1937 |
| 2,265,210 | Waddell | Dec. 9, 1941 |
| 2,360,816 | Pasco | Oct. 17, 1944 |
| 2,552,892 | Garrett et al. | May 15, 1951 |
| 2,654,975 | Adams et al. | Oct. 13, 1953 |
| 2,803,451 | Aldinger | Aug. 20, 1957 |
| 2,824,733 | Nallinger | Feb. 25, 1958 |
| 2,853,096 | Lee | Sept. 23, 1958 |